(12) United States Patent
Kang

(10) Patent No.: US 7,701,333 B2
(45) Date of Patent: Apr. 20, 2010

(54) ALARM-INTEGRATION-MANAGEMENT-ENABLED MOBILE TERMINAL

(75) Inventor: Byoung-Jae Kang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 840 days.

(21) Appl. No.: 11/540,669

(22) Filed: Oct. 2, 2006

(65) Prior Publication Data

US 2007/0080807 A1   Apr. 12, 2007

(30) Foreign Application Priority Data

Oct. 7, 2005   (KR) .................. 10-2005-0094491

(51) Int. Cl.
*G08B 1/08* (2006.01)
(52) U.S. Cl. .................. 340/539.11; 340/539.19; 340/457; 340/7.58; 340/7.59; 340/7.61; 340/7.62; 340/309.7; 455/412.1; 455/567
(58) Field of Classification Search ........... 340/539.11, 340/539.19, 457, 473, 7.58, 7.59, 7.61, 7.62, 340/309.4, 309.7; 455/567, 412.1, 414, 417
See application file for complete search history.

(56) References Cited

U.S. PATENT DOCUMENTS

| | | | | |
|---|---|---|---|---|
| 6,125,281 A | * | 9/2000 | Wells et al. ................. | 455/466 |
| 7,062,026 B1 | * | 6/2006 | Okano ................... | 379/210.01 |
| 7,248,159 B2 | * | 7/2007 | Smith .................... | 340/539.13 |
| 2003/0054865 A1 | * | 3/2003 | Byers et al. ................. | 455/567 |
| 2004/0014484 A1 | * | 1/2004 | Kawashima ............. | 455/550.1 |
| 2005/0096095 A1 | * | 5/2005 | Benco et al. ................ | 455/567 |

* cited by examiner

*Primary Examiner*—Hung T. Nguyen
(74) *Attorney, Agent, or Firm*—Birch, Stewart, Kolasch & Birch, LLP

(57) ABSTRACT

A mobile terminal including an output unit configured to output an alarm, a memory configured to store an expandable alarm-integrated database, and a controller configured to expand the alarm-integrated database to include alarm information corresponding to an alarm feature of content added after the mobile terminal was manufactured.

14 Claims, 4 Drawing Sheets

FIG. 3

| ENTITY | VALUE | | |
|---|---|---|---|
| Alert ID | 00001 | 00002 | 00003 |
| Alert Type | System | Personal | System |
| Alert Name | BatteryLow | Schedule | MP3 Deadline |
| Necessary | 1 | 0 | 1 |
| Input Event | BATTERY_LOW_EVENT | - | - |
| Start Day | - | 20061002 | 20061002 |
| Start Time | - | 0900 | 0911 |
| End Time | - | 0910 | 0912 |
| End Day | - | 20100505 | 20061102 |
| Recurrence | - | Weekly Monday | - |
| Postpone Type | Event | Time | - |
| Postpone time | Event | 10Mins | - |
| Ringer type | Ringtone1 | Ringtone2 | Alerttone1 |
| Vibrate On | OFF | ON | OFF |
| Priority | 0 | 3 | 2 |
| Comment | - | Operational report | - |

...

ered to output an alarm, a memory configured to store an expandable alarm-integrated database, and a controller con-
ALARM-INTEGRATION-MANAGEMENT-ENABLED MOBILE TERMINAL This application claims priority to Korean Patent Application No. 10-2005-0094491 filed on Oct. 7, 2005 in Korea, the entire contents of which is hereby incorporated by reference in its entirety.

BACKGROUND OF THE INVENTION

1. Field of the Invention

The present invention relates to a mobile terminal and corresponding method that manages all alarms in the mobile terminal using a single integrated database.

2. Description of the Background Art

Mobile terminals are generally used to wirelessly communicate with other users. However, mobile terminals also include several other features including a scheduling feature, MP3 features, Internet features, etc. The mobile terminal also generally includes two type of alarm functions to notify the user about a specific condition.

For example, the mobile terminal include system alarms such as a service-unavailable alarm indicating the user is out of a telecommunication service area and a one-minute alarm alerting the user that one minute has passed since his or her call was first established. The mobile terminal also includes personal alarms that are set by the user such as a wake-up alarm or appointment/task alarm. The user is able to selectively set different times for the personal alarms.

However, the user can not set or change a system alarm. That is, the system alarms are preconfigured when the mobile terminal is manufactured and can not be changed by the user. Thus, for new contents that include a system alarm, the user must return the terminal to a representative of the manufacturer, and the representative installs the new feature onto the terminal. During this installation process, the manufacturer adds a separate new database corresponding to the added contents. This increases the number off databases stored on the terminal and results in more complex operations required to access the plurality of separate databases, thus increasing the time necessary to perform the alarm function.

SUMMARY OF THE INVENTION

Accordingly, one object of the present invention is to address the above-noted and other problems.

Another object of the present invention is to provide a mobile terminal that manages all alarms in the mobile terminal using a single integrated database.

To achieve these and other advantages and in accordance with the purpose of the present invention, as embodied and broadly described herein, the present invention provides in one aspect a mobile terminal including an output unit configured to output an alarm, a memory configured to store an expandable alarm-integrated database, and a controller configured to expand the alarm-integrated database to include alarm information corresponding to an alarm feature of content added after the mobile terminal was manufactured.

In another aspect, the present invention provides a method of managing contents on a mobile terminal including adding the contents onto a memory of the mobile terminal after the mobile terminal has been manufactured, expanding an alarm-integrated database included in the memory of the mobile terminal to include alarm information corresponding to an alarm feature of the contents added after the mobile terminal was manufactured, and outputting an alarm based on the alarm information in the alarm-integrated database.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is an overview illustrating a database table according to an embodiment of the present invention.

DETAILED DESCRIPTION OF THE INVENTION

Reference will now be made in detail to the preferred embodiments of the present invention, examples of which are illustrated in the accompanying drawings.

Many new contents are constantly being added to mobile terminals. For example, users can now download MP3 files onto their mobile terminal. Many of the new contents also require an additional alarm function. For example, and in accordance with the present invention, the MP3 download also includes an alarm function warning the user, for example, that the downloaded MP3 file has expired or is about to expire. This is particularly advantageous because a company may provide an MP3 or movie file allowing the user to listen/view the file for free for a predetermined amount of time (e.g., 1 week). Then the file may be disabled at the predetermined time and the user is given an opportunity to purchase the MP3 or video file. Another alarm function includes warning the user when more than 90% of the internal or external memory has been used.

However, because the new contents are often added to the terminal after the terminal has been manufactured, a new database is created for each additional content. Thus, the databases are separate from each other and information in one alarm database is unrelated to information in another alarm database.

To solve this problem, the present invention advantageously provides an alarm-integrated database that can be expanded as needed to thereby allow the mobile terminal to manage all alarm functions in a single database. In more detail, FIG. 1 is a block diagram illustrating a mobile terminal 100 that manages all alarms in the mobile terminal using a single integrated database in accordance with an embodiment of the present invention.

Figure 1:
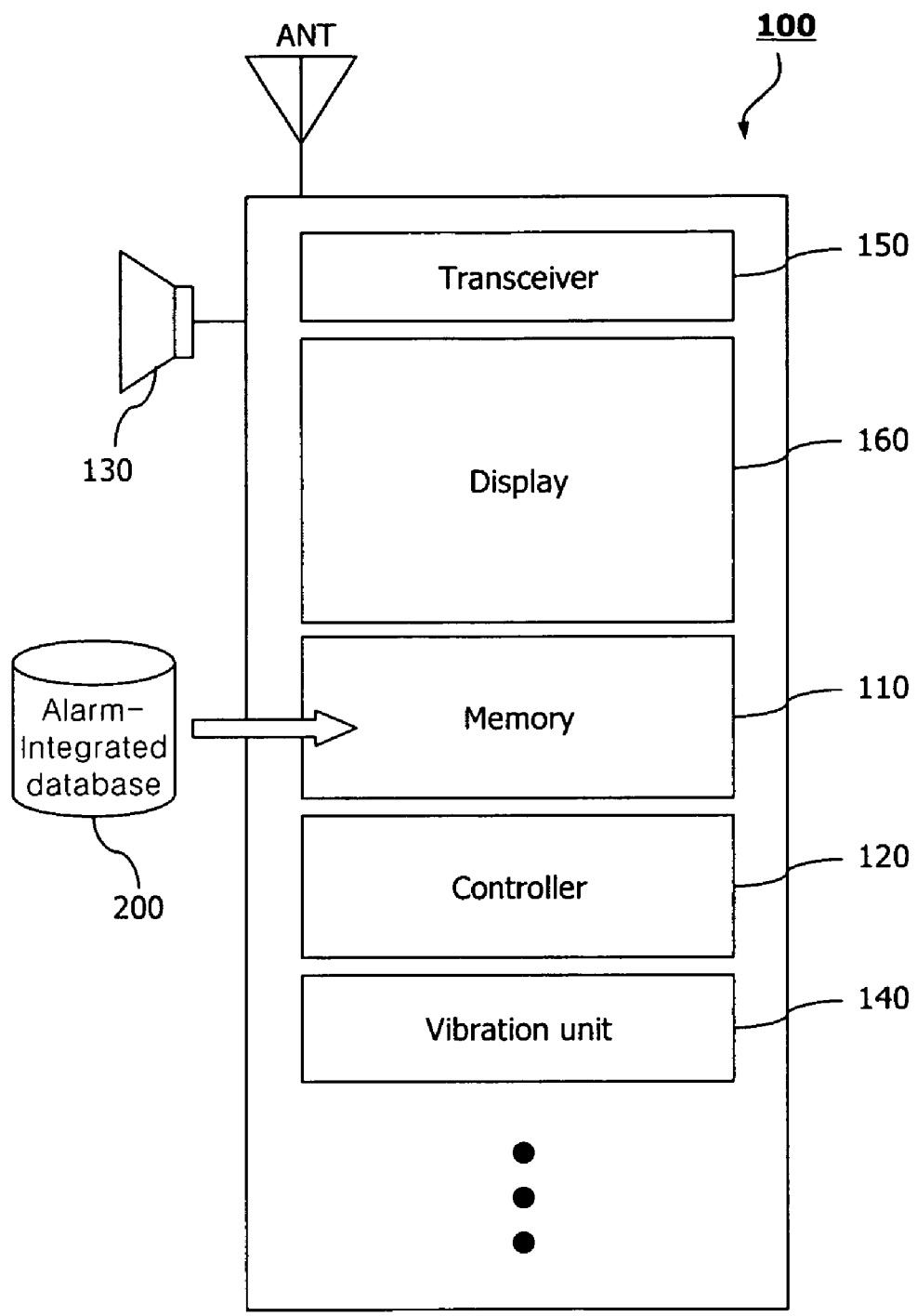
FIG. 1 is a block diagram illustrating a mobile terminal according to an embodiment of the present invention.

As shown in FIG. 1, the mobile terminal 100 includes a memory 110 storing an alarm-integrated database 200, a controller 120 having access to the alarm-integrated database 200 to thereby control an addition and setting of an alarm function, a speaker unit 130 for outputting a sound alarm, and a vibration unit 140 outputting a vibration alarm. The mobile terminal 100 also includes a transceiver 150 for transmitting a synchronization signal and for receiving a signal containing time information (e.g., a satellite time signal or other time signal). A display 160 is also provided for displaying an alarm message when the alarm occurs. The controller 120 also controls the different components of the mobile terminal 100.

Figure 2:
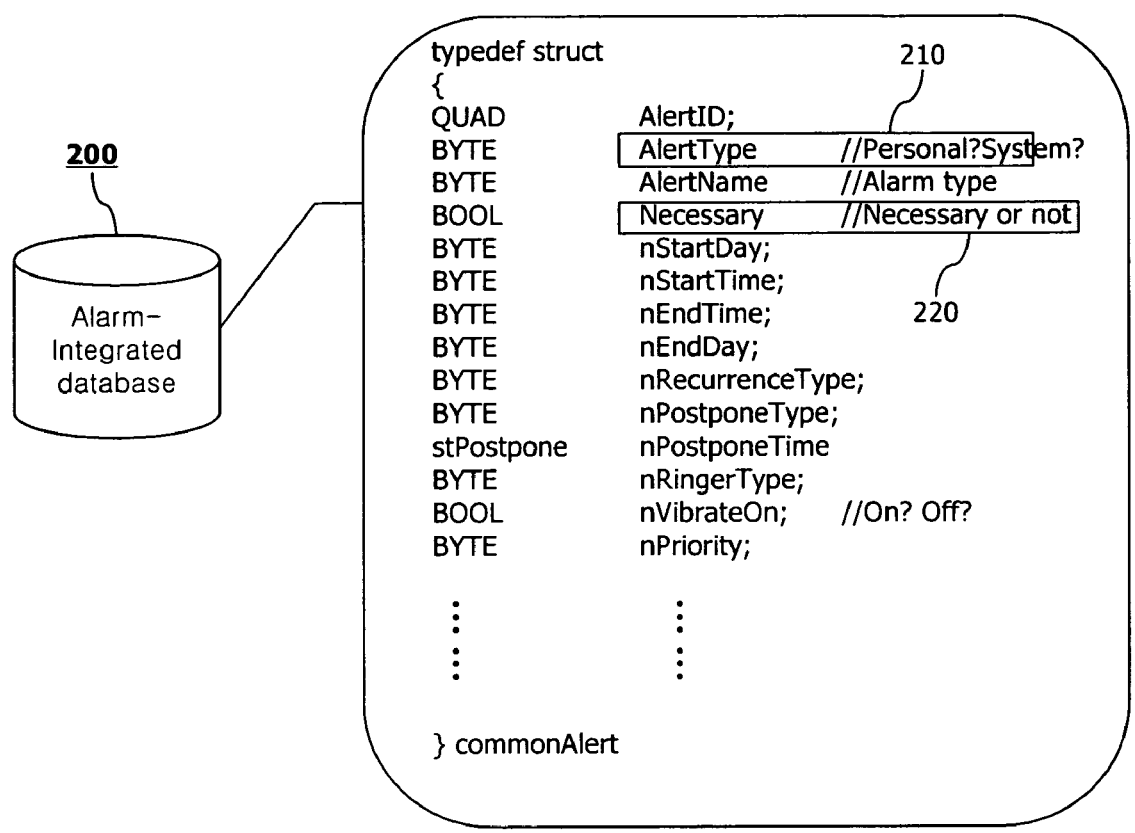
FIG. 2 is an overview illustrating different fields included an alarm-integrated database according to the embodiment of the present invention.

Turning next to FIG. 2, which is an overview of a table included in the alarm-integrated database 200. As shown, the table includes several fields such as an alarm type field 210 and alarm necessary field 220. Furthermore, the table of the alarm-integrated database 200 also includes other required alarm fields such as an alarm identification field, an alarm name field, an event field for inputting the event in which the alarm occurs, an alarm-starting year/month/date/time field, an alarm-ending year/month/date/time field, an alarm sound recurrence type field, an alarm postponement type field, an alarm postponed time field, an alarm sound type field, a vibration ON/OFF field, a priority field, a memo field, etc.

In addition, in accordance with an embodiment of the present invention, the table can be advantageously expanded to include new fields related to contents that are added in real-time. Thus, it is possible to manage information on all contents requiring an alarm in an integrated way using a single alarm-integrated database. The noted fields can also be changed if needed.

Thus, in one example, the controller 120 can determine if a newly added content requires an alarm based on data input in the alarm type field. For example, if the alarm type field 210 is blank, the controller 120 determines the newly added contents does not require an alarm and therefore an alarm function is not added. On the contrary, if the alarm type field 210 is not blank (e.g., includes "Personal" or "System"), the controller 120 determines the newly added contents require an alarm function and thus appropriately adds the new fields in the table related to the alarm function.

In addition, based on the information contained in the alarm type field 210, the controller 120 updates the alarm necessary field 220. That is, the controller 120 updates the alarm necessary field to indicate whether or not the alarm is to be always activated for the newly added contents. That is, the alarm necessary field 220 indicates whether or not the alarm is necessary for the newly added contents.

Thus, when a new content is added to the terminal that includes an alarm function, the controller 120 builds a database including the fields shown in FIG. 2, for example, corresponding to the new content. The controller 120 also stores the database table in the alarm-integrated database 200. For example, FIG. 3 illustrates a database table including contents related to a battery low feature, a scheduling feature and an MP3 deadline feature.

In this example, the battery low feature was originally installed on the mobile terminal by the manufacturer, and the scheduling feature was added by the user. Further, the MP3 downloading content was added to the mobile terminal after the user purchased the mobile terminal from the manufacturer. As shown, the database table includes a variety of different fields for each content such as an alert ID, alert type indicating whether the content corresponds to a system or personal alarm, an alert name, a necessary alarm field, a start day, a start time, an end time, an end day, a recurrence value, a postpone type, a postpone time, a ringer type, a vibrate on/off field, a priority field, and a comment field. Other fields may also be added.

Thus, in this example, when the new MP3 content is added to the mobile terminal, the controller 120 expands the database table to include the appropriate values. That is, the controller 120 sets the alert type field as "System," because the alarm related content is a system alarm, sets the alert name as "MP3 deadline," and sets the alarm necessary field to a bit value of "1." The alarm necessary field is set to a bit value of "1," because the alarm should always be activated when the MP3 deadline falls within the set start day/time and end day/time fields.

In more detail, a user may download an MP3 file onto their mobile terminal. However, the MP3 file may have an expiration date at which point the user can not access the MP3 file anymore. Therefore, an alarm is sounded to warn the user the expiration time has occurred. In FIG. 3, the user would be notified via an Alerttone1 ringer type with no vibration. The information in the start day/time and end day/time fields may also be set to be prior to the actual expiration date to warn the user about the expiration date approaching.

Figure 4:
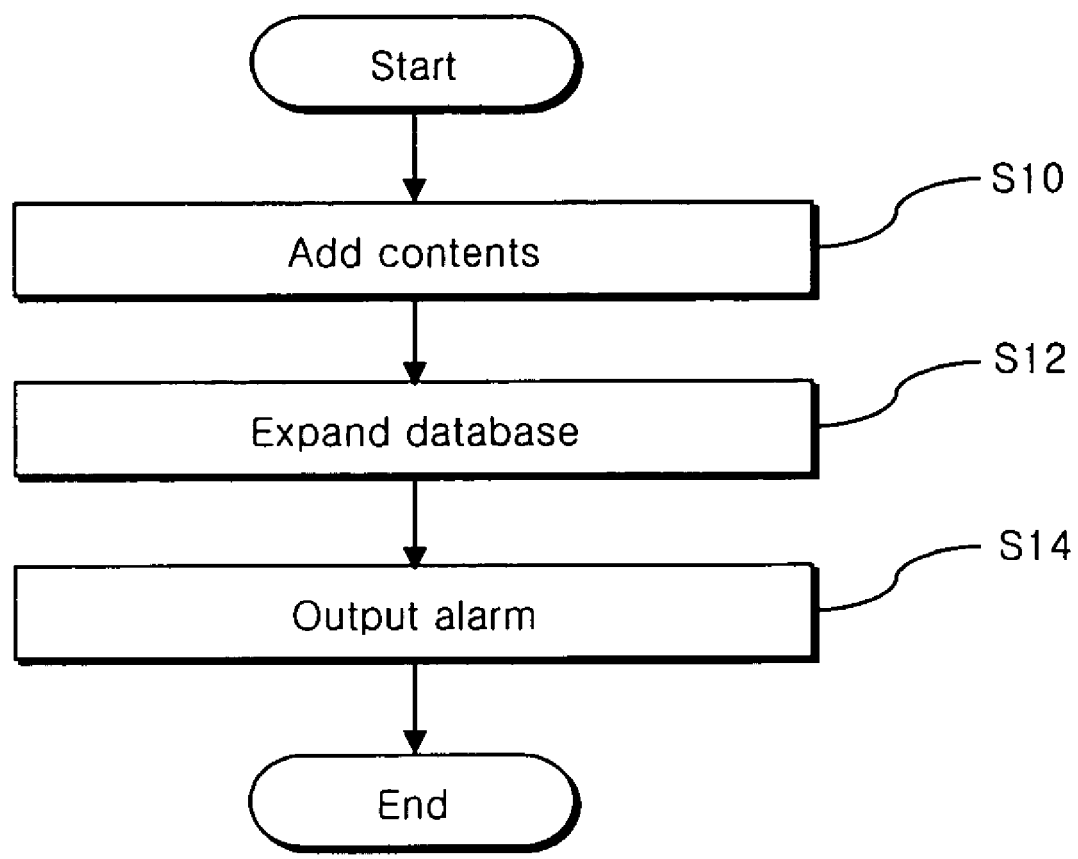
FIG. 4 is a flowchart illustrating a method of managing contents on a mobile terminal in accordance with an embodiment of the present invention.

Turning next to FIG. 4, which is a flowchart illustrating a method of managing contents on a mobile terminal. As shown, the method includes adding the contents onto a memory of the mobile terminal after the mobile terminal has been manufactured (S10), expanding an alarm-integrated database included in the memory of the mobile terminal to include alarm information corresponding to an alarm feature of the contents added after the mobile terminal was manufactured (S12), and outputting an alarm based on the alarm information in the alarm-integrated database (S14).

Therefore, the controller 120 can easily determine that the MP3 deadline alarm is a necessary alarm that should always be activated by simply reading the value in the necessary alarm field. Further, the database is expandable such that a newly added content requiring an alarm is easily accommodated. In addition, there is one central alarm database including the relevant information for all alarms on the mobile terminal, thereby allowing the controller 120 to more easily control the plurality of different alarms. That is, the controller 120 can manage all information on features requiring an alarm function in an integrated way using a single alarm-integrated database.

In addition, the added contents may correspond to a MP3 music file, or a particular ring tone. The added contents may also correspond to a JPEG video file or a MP3 voice file (e.g., a predetermined commercial informing the user about a sale of particular products related to their mobile terminal). Thus, in accordance with the present invention, the user may download new contents on their mobile terminal that is linked with a particular expiration period. The contents may also be disabled (e.g., deleted or deactivated) via a script file that is downloaded with the new contents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal, comprising:
an output unit configured to output an alarm;
a memory configured to store an expandable alarm-integrated database; and
a controller configured to expand the alarm-integrated database to include alarm information corresponding to an alarm feature of content added after the mobile terminal was manufactured, wherein the alarm information corresponding to the alarm feature includes an alert type field indicating whether the alarm feature is a personal or system alarm feature, wherein the alarm information corresponding to the alarm feature further includes output information corresponding to when the alarm is to be output, and a necessary alarm field indicating whether or not the alarm should always be output at the output information, and wherein the alarm information corresponding to the alarm feature further includes an alarm identification field indicating an identification value corresponding to the alarm feature, an alarm name field indicating a name of the alarm feature, an alarm sound recurrence type field indicating how often the alarm is to be output, an alarm sound type field indicating a sound type of the alarm, a vibration ON/OFF field indicating whether the mobile terminal is to be vibrated when the alarm is output, a priority field indicating a priority of the alarm feature, and a comment field indicating comments related to the alarm feature.

2. The mobile terminal of claim 1, wherein the output information comprises date and time information indicating when the system or personal alarm is to be output.

3. The mobile terminal of claim 2, wherein the content added corresponds to a file downloaded onto the mobile terminal, and wherein the date and time information indicates when the downloaded file will expire such that a user of the mobile terminal can not again access the downloaded file.

4. The mobile terminal of claim 1, wherein the output information comprises event information identifying an event at which time the system or personal alarm is to be output.

5. The mobile terminal of claim 1, wherein the output unit comprises at least one from a speaker and a vibration unit configured to output the system or personal alarm.

6. The mobile terminal of claim 1, further comprising:
a transceiver configured to transmit a synchronization signal and receive a signal containing time information; and
a display configured to display an alarm message when the system or personal alarm is output.

7. The mobile terminal of claim 1, wherein the content added corresponds to one of an MP3 file, a video file or an advertisement.

8. A method of managing contents on a mobile terminal, the method comprising:
adding the contents onto a memory of the mobile terminal after the mobile terminal has been manufactured;
expanding an alarm-integrated database included in the memory of the mobile terminal to include alarm information corresponding to an alarm feature of the contents added after the mobile terminal was manufactured; and
outputting an alarm based on the alarm information in the alarm-integrated database, wherein the alarm information corresponding to the alarm feature includes an alert type field indicating whether the alarm feature is a personal or system alarm feature, wherein the alarm information corresponding to the alarm feature further includes output information corresponding to when the alarm is to be output, and a necessary alarm field indicating whether or not the alarm should always be output at the output information, and wherein the alarm information corresponding to the alarm feature further includes an alarm identification field indicating an identification value corresponding to the alarm feature, an alarm name field indicating a name of the alarm feature, an alarm sound recurrence type field indicating how often the alarm is to be output, an alarm sound type field indicating a sound type of the alarm, a vibration ON/OFF field indicating whether the mobile terminal is to be vibrated when the alarm is output, a priority field indicating a priority of the alarm feature, and a comment field indicating comments related to the alarm feature.

9. The method of claim 8, wherein the output information comprises date and time information indicating when the system or personal alarm is to be output.

10. The method of claim 9, wherein the contents added corresponds to a file downloaded onto the mobile terminal, and wherein the date and time information indicates when the downloaded file will expire such that a user of the mobile terminal can not again access the downloaded file.

11. The method of claim 9, wherein the contents added corresponds to one of an MP3 file, a video file or an advertisement.

12. The method of claim 8, wherein the output information comprises event information identifying an event at which time the system or personal alarm is to be output.

13. The method of claim 8, wherein the outputting step comprises outputting the system or personal alarm via at least one from a speaker and a vibration unit.

14. The method of claim 8, further comprising: transmitting a synchronization signal and receiving a signal containing time information; and displaying an alarm message when the system or personal alarm is output.

* * * * *